United States Patent
Zhang (10) Patent No.: US 11,942,882 B2
(45) Date of Patent: Mar. 26, 2024

(54) PERMANENT MAGNET SYNCHRONOUS MOTOR (PMSM) AND METHOD FOR STARTING THE PMSM

(71) Applicant: STMICROELECTRONICS (BEIJING) R&D CO. LTD, Beijing (CN)

(72) Inventor: Na Zhang, Beijing (CN)

(73) Assignee: STMICROELECTRONICS (BEIJING) R&D CO. LTD, Beijing (CN)

( * ) Notice: Subject to any disclaimer, the term of this patent is extended or adjusted under 35 U.S.C. 154(b) by 0 days.

(21) Appl. No.: 17/828,413

(22) Filed: May 31, 2022

(65) Prior Publication Data

US 2023/0387845 A1 Nov. 30, 2023

(51) Int. Cl.
*H02P 21/34* (2016.01)
*H02P 21/10* (2016.01)

(52) U.S. Cl.
CPC .............. *H02P 21/34* (2016.02); *H02P 21/10* (2013.01); *H02P 2207/055* (2013.01)

(58) Field of Classification Search
CPC .... H02P 21/34; H02P 21/10; H02P 2207/055; H02P 6/21; H02P 25/089; H02P 1/66; G05B 2219/42107; G05B 2219/42122; G05B 2219/42098
See application file for complete search history.

(56) References Cited

U.S. PATENT DOCUMENTS

| 7,667,423 | B2 * | 2/2010 | Shahi | ...................... H02P 21/18 318/432 |
| 9,369,073 | B1 * | 6/2016 | Tian | .......................... H02P 6/181 |
| 2014/0152212 | A1 | 6/2014 | Zhang et al. | |
| 2015/0311845 | A1 * | 10/2015 | Nagata | ..................... H02P 21/26 318/400.02 |
| 2016/0056740 | A1 * | 2/2016 | Nondahl | ................. H02P 6/182 318/400.11 |
| 2020/0358382 | A1 * | 11/2020 | Lan | ........................... H02P 6/21 |
| 2023/0067785 | A1 * | 3/2023 | Li | ............................ H02P 21/13 |

\* cited by examiner

*Primary Examiner* — Bickey Dhakal
(74) *Attorney, Agent, or Firm* — Slater Matsil, LLP (57) ABSTRACT

A method of starting a permanent magnet synchronous motor (PMSM) with field oriented control (FOC) includes: opening a first control loop of the PMSM; setting a first direction for a first current component of the PMSM; aligning a rotor of the PMSM to the first direction; after aligning the rotor, setting a second direction for the first current component, where the second direction is rotated from the first direction by 90 degrees; after setting the second direction, starting the rotor while the first control loop of the PMSM remains open; after starting the rotor, increasing a rotation speed of the rotor by operating the first control loop in a first closed-loop mode; and after increasing the rotation speed of the rotor, controlling the rotation speed of the rotor by operating the first control loop in a second closed-loop mode different from the first closed-loop mode.

19 Claims, 7 Drawing Sheets

PERMANENT MAGNET SYNCHRONOUS MOTOR (PMSM) AND METHOD FOR STARTING THE PMSM

TECHNICAL FIELD

The present invention relates generally to motor control, and, in particular embodiments, to permanent magnet synchronous motor (PMSM) and method for starting the PMSM motor, e.g., from standstill.

BACKGROUND

Permanent magnet synchronous motor (PMSM) is a popular choice among device manufacturers due to its high power density, fast dynamic response, and high efficiency compared with other types of motors. Typically, motor applications (e.g., air conditioner or refrigerator) require fast response for speed change, quieter units, and energy efficiency. Field oriented control (FOC) has emerged as the leading technique for motor control to achieve the various performance requirements.

Permanent magnet synchronous motor (PMSM) using sensorless control has been widely used in inverter refrigerator and other home appliances. The start-up and control of PMSM using sensorless control usually includes positioning stage, asynchronous driving stage, and speed closed-loop control stage. For example, after completing the asynchronous driving stage, the motor directly switches to the speed closed-loop control stage. However, when the load carried by the motor is too large (e.g., when the compressor is started with high back pressure), and since the response of the speed-loop control stage may be slow, the speed of the motor rotor may drop sharply due to the large load, resulting in the rotor and the rotating magnetic flux generated by the three-phase currents of the motor to be out of synchronization, which leads to motor startup failure. There is a need in the art for PMSM systems and control methods thereof that could reliably and smoothly start the PMSM from standstill, even with a large load.

SUMMARY

In some embodiments, a method of starting a permanent magnet synchronous motor (PMSM) with field oriented control (FOC) includes: opening a first control loop of the PMSM; setting a first direction for a first current component of the PMSM; aligning a rotor of the PMSM to the first direction; after aligning the rotor, setting a second direction for the first current component, where the second direction is rotated from the first direction by 90 degrees; after setting the second direction, starting the rotor while the first control loop of the PMSM remains open; after starting the rotor, increasing a rotation speed of the rotor by operating the first control loop in a first closed-loop mode; and after increasing the rotation speed of the rotor, controlling the rotation speed of the rotor by operating the first control loop in a second closed-loop mode different from the first closed-loop mode.

In some embodiments, a method of starting a permanent magnet synchronous motor (PMSM) with field oriented control (FOC) includes: setting a control loop of the PMSM in open-loop mode; and while the control loop is in open-loop mode: setting a first direction for a first current component of the PMSM; positioning a rotor of the PMSM along the first direction; after positioning the rotor, abruptly setting a second direction for the first current component, wherein the second direction is perpendicular to the first direction; and after abruptly setting the second direction, asynchronously driving the rotor to rotate the rotor. The method further includes: after asynchronously driving the rotor for a first period of time, operating the control loop in a first closed-loop mode; and after operating the control loop in the first closed-loop mode for a second period of time, operating the control loop in a second closed-loop mode different from the first closed-loop mode.

In some embodiments, a permanent magnet synchronous motor (PMSM) system with field oriented control (FOC) includes: a PMSM motor; an inverter coupled to the PMSM motor; and a controller coupled to the inverter, wherein the controller is configured to start the PMSM by: setting a control loop of the PMSM in open-loop mode; while the control loop is in open-loop mode: setting a first direction for a first current component of the PMSM; positioning a rotor of the PMSM along the first direction; after positioning the rotor, abruptly setting a second direction for the first current component, wherein the second direction is perpendicular to the first direction; and after abruptly setting the second direction, asynchronously driving the rotor to rotate the rotor; after asynchronously driving the rotor for a first period of time, operating the control loop in a first closed-loop mode; and after operating the control loop in the first closed-loop mode for a second period of time, operating the control loop in a second closed-loop mode different from the first closed-loop mode.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of motor control, and in particular embodiments, a multi-stage control method to start a PMSM, e.g., from standstill. The disclosed multi-stage control method is able to start the PMSM reliably and smoothly, even with a large load. The disclosed start-up control method may be applicable to other types of motors besides PMSM.

Figure 1:
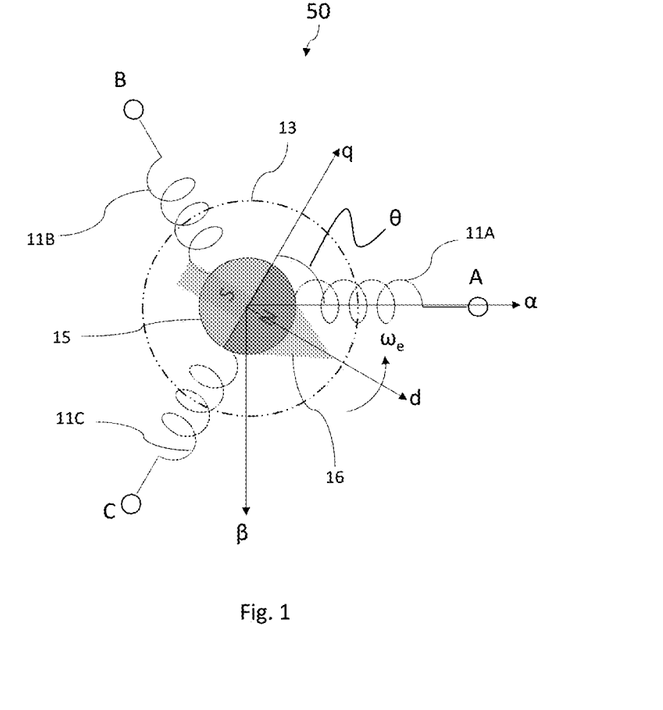
FIG. 1 illustrates a schematic view of a permanent magnet synchronous motor (PMSM), in an embodiment.

FIG. 1 illustrates a schematic view of a permanent magnet synchronous motor (PMSM) 50, in an embodiment. Note that FIG. 1 is a high-level abstract of the PMSM intended to facilitate subsequent discussion. For simplicity, not all features of the PSMS 50 are illustrated in FIG. 1.

FIG. 1 illustrates a rotor 15, a stator 13, and windings 11A, 11B, and 11C of the stator 13. The windings 11A, 11B, and 11C are connected to a three-phase power supply through nodes A, B, and C, respectively. The rotor 15 has permanent magnets embedded therein. The three-phase power supply generates a rotating magnetic field. The rotor 15 is driven (e.g., rotated) through the magnetic interaction between the rotating magnetic field and the magnetic field of the permanent magnets in the rotor 15.

The arrow 16 in FIG. 1 illustrates the direction of the magnetic moment of the rotor 15 (e.g., pointing from the south magnetic pole to the north magnetic pole of the rotor 15), which may also be referred to as the direction of the rotor 15. FIG. 1 further illustrates a two-axis coordinate system α-β defined by two orthogonal axes a and p. The two-axis coordinate system α-β is a stationary coordinate system referenced to the stator 13. As one skilled in the art readily appreciates, the three-phase currents $i_a$, $i_b$, and $i_c$ (which are in a three-axis coordinate system) supplied to the windings 11A, 11B, and 11C may be converted into current components $i_\alpha$ and $i_\beta$ in the two-axis coordinate system α-β by a Clarke transformation: $i_\alpha = i_a$, and $i_\beta = -(i_a + 2i_b)/\sqrt{3}$. Note that the sum of the phase currents $i_a$, $i_b$, and $i_c$ is zero (e.g., $i_a + i_b + i_c = 0$). Since the three-phase currents $i_a$, $i_b$, and $i_c$ are time-varying, the current components $i_\alpha$ and $i_\beta$ transformed in the two-axis coordinate system α-β are also time varying, and may be represented by a rotating phasor in the two-axis coordinate system α-β.

FIG. 1 further illustrates a two-axis coordinate system d-q defined by two orthogonal axes d and q. The two-axis coordinate system d-q is attached to the rotor 15 and rotates with the rotor 15. For example, the axis d is aligned with the magnetic moment of the rotor 15. One skilled in the art will also appreciate that the current components $i_\alpha$ and ip in the two-axis coordinate system α-β may be transformed into current components $i_d$ and $i_q$ in the two-axis coordinate system d-q by a Park transformation: $i_d = i_\alpha \sin\theta + i_\beta \cos\theta$, $i_q = i_\alpha \cos\theta - i_\beta \sin\theta$, where the transformation angle θ used in the Park transformation is the angle of rotation between the two-axis coordinate system α-β and the two-axis coordinate system d-q. The transformation angle θ may be referred to as the transformation angle θ of the Park transformation, or the rotation angle θ between the Clarke transformation and the Park transformation.

Figure 2:
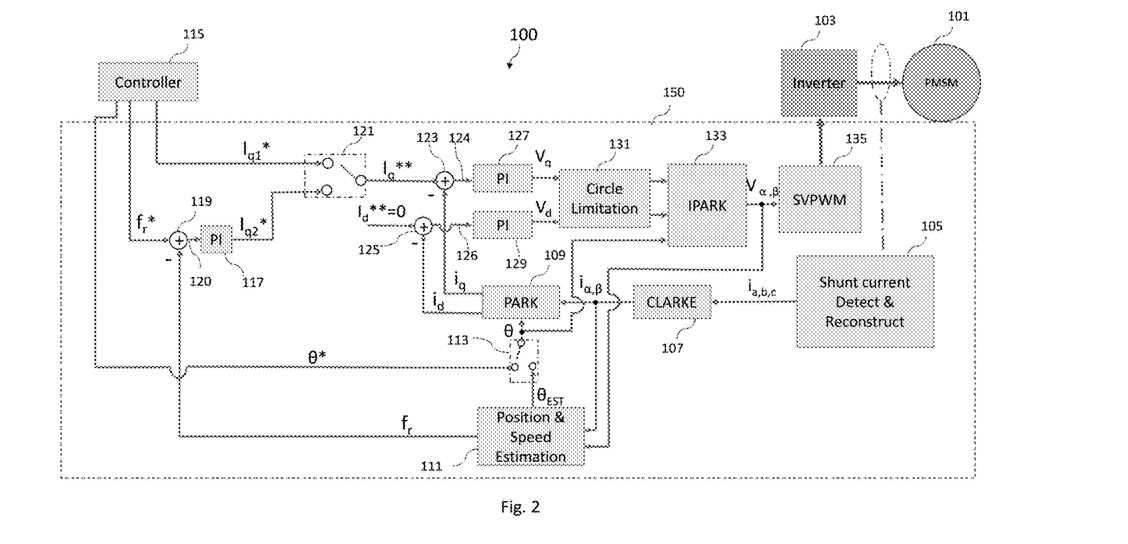
FIG. 2 illustrates a block diagram of a PMSM system with field oriented control (FOC), in an embodiment.

FIG. 2 illustrates a block diagram of a PMSM system 100 with field oriented control (FOC), in an embodiment. As illustrated in FIG. 2, the PMSM system 100 includes a permanent magnet synchronous motor (PMSM) 101, an inverter 103 coupled to the PMSM 101, a control block 150, and a controller 115. The PMSM 101 may be the PMSM 50 of FIG. 1. In the example of FIG. 2, the rotor of the PMSM 101 does not have positions sensors, and therefore, the PMSM system 100 may also be referred to as a PMSM system with sensorless FOC. The inverter 103 may be, e.g., a DC-AC converter that generates the three-phase driving voltages (or the three-phase currents) supplied to the windings 11A/11B/11C of the stator of the PMSM 101. The control block 150 includes control loops for controlling operation of the PMSM 101. The controller 115 may be, e.g., a micro-controller, that controls the operation of PMSM 101 by sending control signals and reference signals to the control block 150. For example, as discussed in more details below, the controller 115 may generate control signals and reference signals for switching between difference phases of operation during start-up of the PMSM 101.

Note that the control block 150 in FIG. 1 is illustrated to show the functionalities of the control loops. The control block 150 may be formed by circuits/components outside of the controller 115, in some embodiments. In some embodiments, some portions of the control block 150, or all of the control block 150, are formed as a software program executed by the controller 115. For example, the PMSM system 100 may include a memory (e.g., a non-volatile memory) that stores a computer program (e.g., instructions), which when executed by the controller 115, performs the functionalities of the control block 150.

As illustrated in FIG. 2, the control block 150 includes a shunt current detection and reconstruction block 105, which performs winding current detection and reconstruction to generate estimates of the phase currents $i_a$, $i_b$, and $i_c$, in the windings of the PMSM 101, which are denoted as $i_{a,b,c}$ in FIG. 2. Methods for winding current detection and reconstruction are known in the art, and therefore, are not discussed here.

The estimated phase currents $i_a$, $i_b$, and $i_c$, are transformed by a Clarke transformation block 107 into current components $i_\alpha$ and $i_\beta$ in the two-axis coordinate system α-β, which are denoted as $i_{\alpha,\beta}$ in FIG. 2. Clarke transformation is discussed above, thus not repeated here.

The current components $i_\alpha$ and $i_\beta$ in the two-axis coordinate system α-β are transformed into current component $i_d$ and $i_q$ in the two-axis coordinate system d-q by a Park transformation. Park transformation is discussed above, thus not repeated. Note that depending on the switching position of the switch 113, the transformation angle θ used in the Park transformation may be an angle θ* provided by the controller 115, or an angle $\theta_{EST}$ provided by a position and speed estimation block 11 of the control block 150. The angle $\theta_{EST}$ is an estimate of the rotation angle θ (see, e.g., FIG. 1) between the two-axis coordinate system α-β and the two-axis coordinate system d-q, in some embodiments. Since the two-axis coordinate system d-q rotates with the rotor 15, the angle $\theta_{EST}$ may also be referred to as an (estimated) angle between the rotor 15 and the two-axis coordinate system α-β, or as an (estimated) angle between the rotor 15 and the stator 13.

As illustrated in the example of FIG. 2, based on the current components $i_\alpha$ and $i_\beta$ and outputs of an inverse Park transformation block 133 (e.g., voltage signal $V_a$ and Vg discussed below), the position and speed estimation block 11 provides the angle $\theta_{EST}$, and provides a rotation speed f, as an estimate of the rotation speed of the rotor 15 of the PMSM 101. Position and speed estimation are known in the art, thus are not discussed here. The switch 113 is controlled by the controller 115 to select, at different phases of the start-up process, different inputs (e.g., θ* or $\theta_{EST}$) as the transformation angle θ used in the Park transformation. Details of the start-up process are discussed hereinafter.

Still referring to FIG. 2, the current component $i_q$ and $i_d$ are compared with a first reference current value $I_q^{}$ and a second reference current value $I_d^{}$, respectively, to generate a first error signal 124 and a second error signal 126. For example, the current component $i_q$ is subtracted from the first reference current value $I_q^{}$ to generate the first error signal 124, and the current component $i_d$ is subtracted from the second reference current value $I_d^{}$ to generate the second error signal 126. In some embodiments, the first reference current value $I_q^{}$ is a reference current value used for controlling a torque current component (e.g., $i_q$), and the second reference current value $I_d^{}$ is a reference current value used for controlling a flux current component (e.g., $i_d$). Therefore, the control block 150 of FIG. 2 has two control loops: a first control loop that uses the first reference current value $I_q^{}$ and is driven by the first error signal 124, and a second control loop that uses the second reference current value $I_d^{}$ and is driven by the second error signal 126. In the example of FIG. 2, the feedforward path of the first control loop includes the PI circuit 127, the circle limitation block 131, the inverse Park transformation block 133, the SVPWM block 135, and the inverter 103. The feedback path of the first control loop includes the shunt current detection and reconstruction block 105, the Clarke transformation block 107, the Park transformation block 109, and the position and speed estimation block 11. The feedforward path of the second control loop includes the PI circuit 129, and shares other functional blocks (e.g., 131, 133, 135, and 103) with the feedforward path of the first control loop. The feedback path of the second control loop includes the same functional blocks (e.g., 105, 107, 111, and 113) as the feedback path of the first control loop. As will be described in detail below, depending on the position of the switch 121, the first control loop may be referred to as a torque control loop or a speed control loop. In particular, when the switch 121 selects the reference current value $I_{q1}^*$, the first control loop is referred to as a torque control loop, and when the switch 121 selects the reference current value $I_{q2}^*$, the first control loop is referred to as a speed control loop.

Notably, in the example of FIG. 2, the second reference current value I has a constant value of zero. Depending on the position of the switch 121, the first reference current value $I_q^{}$ may be a reference value $I_{q1}^*$ provided by the controller 115, or may be a reference value $I_{q2}^*$ provided by a proportional-integral (PI) circuit 117. The switch 121 is controlled by the controller 115 to select, at different phases of the start-up process, different reference current values (e.g., $I_{q1}^*$ or $I_{q2}^*$). Details of the start-up process are discussed hereinafter.

The first error signal 124 and the second error signal 126 are sent to PI circuits 127 and 129, respectively. Proportional-integral (PI) circuits are widely used in control theory and are known in the art, thus not discussed here. The outputs of the PI circuits 127 and 129 are voltages $V_q$ and $V_d$ in the two-axis coordinate system d-q, respectively. The circle limitation block 131 checks whether the amplitude of the voltages (e.g., $\sqrt{V_q^2+V_d^2}$) is within a pre-determined level (e.g., on a circle), and modifies (e.g., scales, or reduces at least one of the voltages $V_d$ and $V_q$) the voltages $V_d$ and $V_q$ if the amplitude is larger than the pre-determined level, so that the amplitude of the modified voltages $V_d$ and $V_q$ is within the pre-determined level.

The voltage signals at the output of the circle limitation block 131 is rotated back to the two-axis coordinate system α-β by an inverse Park transformation block 133, to generate voltage signal $V_\alpha$ and $V_\beta$, which are denoted as $V_{\alpha,\beta}$ in FIG. 2. The voltage signal $V_\alpha$ and $V_\beta$ are then transformed to voltages $V_a$, $V_b$, and $V_c$ using an inverse Clarke transformation. In some embodiments, the voltages $V_a$, $V_b$, and $V_c$ are used by a space vector pulse width modulation (SVPWM) block 135 to generate PWM signals, which PWM signals are used to drive the inverter 103 to generate the three-phase voltages (or three-phase currents) supplied to the windings of the PMSM 101. In the example of FIG. 2, the inverse Clarke transformation function is combined with (e.g., implemented as a part of) the SVPWM block 135 to improve implementation efficiency. Inverse Park transformation and inverse Clarke transformation perform the inverse operations of the Park transformation and the Clarke transformation, respectively, details are not discussed here. The SVPWM block is known and used in the art, thus details are not discussed here.

Operation of the PMSM system 100 during start-up of the PMSM 101 is a multi-phase process (also referred to as a multi-stage process) performed under the control of the controller 115. The switching between the different phases (also referred to as different stages) of the multiple-phase process, or gear-switching, is discussed in detail below with reference to FIGS. 3-5.

Figure 3:
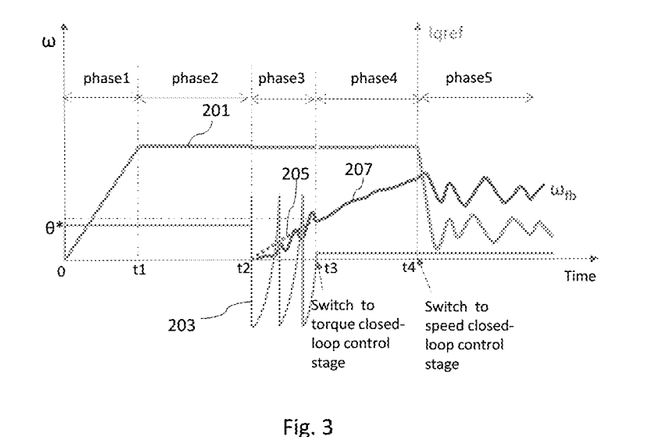
FIG. 3 illustrates various signals during start-up of the PMSM system of FIG. 2, in an embodiment.

FIG. 3 illustrates various signals during the start-up process of the PMSM system 100 of FIG. 2, in an embodiment. In particular, curve 201 illustrates the first reference current value $I_q^{**}$, curve 203 illustrates the angle θ*, curve 207 illustrates the rotation speed of the rotor 15, and the dashed line 205 illustrates the expected rotation speed of the rotor 15 during phase 3 of the start-up process. The x-axis of FIG. 3 shows time, and the y-axis shows the values of the various signals. The start-up process of the PMSM system 100 may be partitioned into phases 1-5, with time instants 0, t1, t2, t3, and t4 indicating the beginning of each of the phases.

Figure 4A:
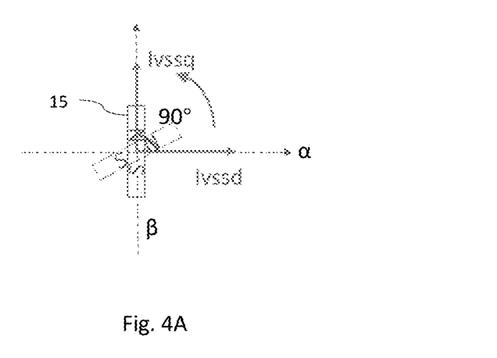
FIGS. 4A and 4B illustrate relative positions of the rotor of the PMSM and current components of the PMSM during start-up of the PMSM, in an embodiment.

Referring to FIG. 3, the start-up process starts at time instant o. The rotor 15 may be stopped (e.g., at standstill) at an unknown, random angular position prior to time instant o. In phase 1 of the start-up process, which is between time instant 0 and time instant $t_1$, the rotor 15 is set to a known position by aligning the direction (e.g., the magnetic moment or the north magnetic pole of the rotor 15) of the rotor 15 to a known direction, such as a pre-determined direction set by the controller 115. In some embodiments, in phase 1, the controller 115 switches the switch 113 to a position such that the angle θ* provided by the controller 115 is used as the transformation angle θ of the Park transformation block 109 (and the inverse Park transformation block 133), and the controller 115 switches the switch 121 to a position such that the reference current value $I_{q1}^*$ provided by the controller 115 is used as the first reference current value $I_q^{**}$. In the example of FIG. 3, the angle θ* has a constant value of, e.g., 90 degrees, between time instant 0 and time instant t2. The reference current value $I_{q1}^*$ provided by the controller 115 increases gradually from zero at time instant o to a pre-determined value at time instant t1, and remains constant between time instants t1 and t4. By increasing the reference current value $I_{q1}$ gradually from zero to the pre-determined value, overshoot of the rotor 15 may be avoided. FIG. 4A shows the aligning of the rotor 15 in phase 1.

Referring temporarily to FIG. 4A, the rectangular shape in dashed line shows the position of the rotor 15 (illustrated as a magnetic bar with a north magnetic pole N and a south magnetic pole S) at time instant o, and the rectangular shape in solid line shows the position of the rotor 15 at time instant t1. FIG. 4A also illustrates two current components $I_{vssq}$ and $I_{vssd}$ (which are generated by setting the angle θ* and the reference current value $I_{q1}^*$ as discussed above) in the two-coordinate system d-q, which is rotated by 90 degrees from the two-axis coordinate system α-β. Due to the interaction of magnetic forces, the rotor 15 turns to align with the direction of the current component $I_{vssq}$ (e.g., a torque current component). Therefore, phase 1 is also referred to as a rotor positioning stage, or a rotor alignment stage.

Referring back to FIG. 3, phase 2 of the start-up, which is between time instants t1 and t2, is used for the rotor 15 to settle down at the direction of the current component $I_{vssq}$. Phase 2 may last, e.g., between about 500 ms and about 1000 ms, so that the rotor 15, which may oscillate around the direction of the current component $I_{vssq}$, settles down and stops at that direction. Phase 2 may also be referred to as a rotor settling stage or a rotor stabilization stage. Note that in phase 2 and phase 3 of the start-up process, the switches 113 and 121 remain at the same respective locations as in phase 1.

Figure 4B:
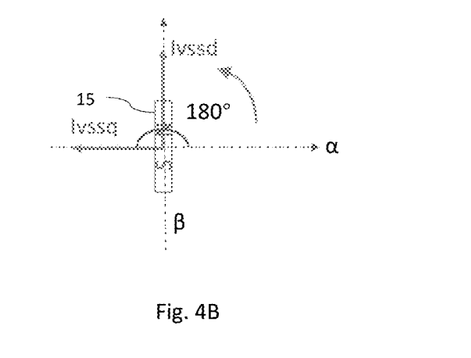

Next, at time instant t2, the direction of the current component $I_{vssq}$ is changed abruptly (e.g., instantly or suddenly, instead of a gradual change) to rotate 90 degrees from the direction of the current component $I_{vssq}$ in phase 2. In some embodiments, to change the direction of the current component $I_{vssq}$ abruptly, the controller 115 changes the value of the angle θ* suddenly from 90 degrees to 180 degrees, as illustrated by the spike, or a sudden change, in the value of the curve 203 at time instant t2. FIG. 4B illustrates the abrupt change of the direction of the current component $I_{vssq}$.

Referring temporarily to FIG. 4B, at time instant t2, the direction of the current component $I_{vssq}$ is rotated suddenly by 90 degrees from its position in FIG. 4A. Due to inertia, the rotor 15 is still aligned to the same (vertical) direction as in FIG. 4A. As a result, the direction of the magnetic moment (e.g., the flux direction) of the rotor 15 and the direction of the current component $I_{vss}q$ has a 90 degree offset (e.g., are perpendicular to each other), which maximizes the torque on the rotor 15 to start rotating the rotor 15.

Referring back to FIG. 3, after the abrupt change of the direction of the current component $I_{vssq}$ at time instant t2, the start-up process enters phase 3, which is between the time instants t2 and t3. During phase 3, the controller 115 changes the value of the angle θ* continuously over a pre-determined range. For example, the controller 115 may sweep the angle θ* from −180 degree to 180 degree repeatedly (e.g., for multiple circles, as illustrated by the values of the curve 203 in phase 3), or may sweep only a fraction of a circle. Sweeping the angle θ* effectively drags the rotor 15 to rotate with the rotating magnetic field generated by the currents in the stator windings.

Note that in phase 1, phase 2, and phase 3 of the start-up process, the switch 113 does not select the output of the position and speed estimation block 11. As such, the feedback paths of the first and second control loops of the control block 150 are not closed, and therefore, the first control loop and the second control loop of the control block 150 are open (also referred to as in open-loop state). Due to the open-loop status of the control loops, the rotor 15 are dragged along by the rotating magnetic field, but synchronization between the rotor and the rotating magnetic field are not guaranteed. Therefore, phase 3 is also referred to as an asynchronous driving stage.

The dashed line 205 in FIG. 3 illustrates the expected speed of the rotor during phase 3. The curve 207 shows the actual (e.g., measured, or estimated) rotation speed of the rotor. As illustrated in FIG. 3, the rotation speed of the rotor increases gradually in phase 3.

Next, at time instant t3, the switch 113 of FIG. 2 switches to a position such that the output $\theta_{EST}$ of the position and speed estimation block 111 is selected as an input (e.g., the transformation angle) of the Park transformation block 109 (and the inverse Park transformation block 133), and therefore, the first control loop and the second control loop of the control block 150 are now closed (also referred to as in closed-loop mode). The start-up process now enters phase 4, which is between time instants t3 and t4. Note that in phase 4, the switch 121 still selects the reference current I*1 from the controller 115. The reference current $I_{q1}$* may be set to a value (e.g., a constant value during phases 2-4) corresponding to a large torque current component, such that a large torque is generated on the rotor 15 to drive the rotor 15 and to increase the rotation speed of the rotor 15. Due to the position of the switch 121 in phase 1-phase 4, the first control loop of the control block 150 is also referred to as a torque control loop during phase 1-phase 4. The torque control loop is in open-loop mode in phases 1-3, and is in closed-loop mode in phase 4. Therefore, phase 4 is also referred to as the torque closed-loop control stage. Note that the angle θ* is no longer used for controlling the PMSM 101 after time instant t3, and therefore, its value is "don't care" for the PMSM system 100 after time instant t3. In the example of FIG. 3, in phase 4 and phase 5, the angle θ* keeps its value at the end of phase 3 (e.g., at time instant t3).

In phase 4, the torque control loop provides a large torque to increase the rotation speed of the rotor. The torque control loop also has a quicker response time than the speed control loop described below. These characteristics advantageously reduces the possibility of the rotor and the rotating magnetic flux becoming out of synchronization, thereby reducing or preventing motor start failure. As illustrated in FIG. 3, the rotation speed of the rotor increases continuously during phase 4. When the rotation speed of the rotor reaches a pre-determined (e.g., at time instant t4), the start-up process enter phase 5.

At time instant t4, the controller 115 switches the switch 121 to a position such that the output $I_{q2}$* of the PI circuit 117 is selected as the first reference current value $I_q$**, and the start-up process enters phase 5. Note that in phase 5, the switch 113 still selects the output of the position and speed estimation block 11, as in phase 4. Note that the output $I_{q2}$* is computed by: subtracting an estimated rotation speed $f_r$(which is generated by the position and speed estimation block 111) from a target rotation speed $f_r$* provided by the controller 115 to generate a speed error signal 120, and send the speed error signal 120 to the PI circuit 117. The output of the PI circuit 117 is the output $I_{q2}$*, which is used as the first reference current value $I_q$** in phase 5. Due to the position of the switch 121 in phase 5, the first control loop of the control block 150 is also referred to as a speed control loop, which speed control loop is in closed-loop mode. Phase 5 is also referred to as the speed closed-loop control stage.

As illustrated by the curve 201 in FIG. 3, in phase 5, the first reference current value $I_q$** varies over time, because the estimated rotor rotation speed f varies over time. The curve 207 shows the rotation speed of the rotor, which oscillates around a target rotation speed.

Figure 5:
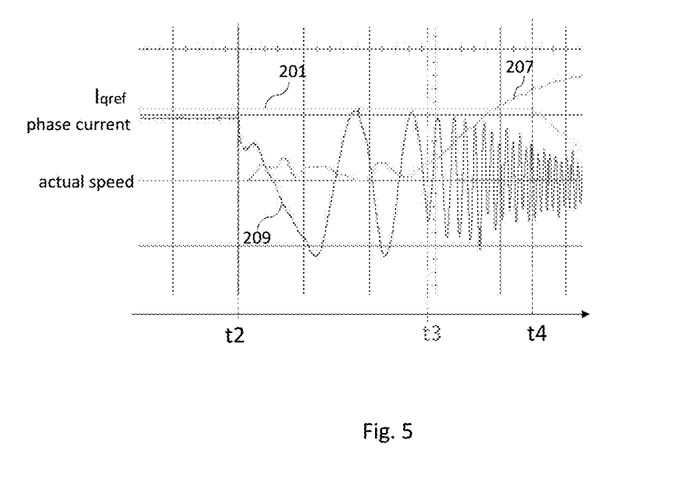
FIG. 5 illustrates various signals captured during the start-up process of the PMSM system of FIG. 2, in another embodiment.

FIG. 5 illustrates various signals during start-up of the PMSM system of FIG. 2, in another embodiment. The signals shown in FIG. 5 may corresponds to a detailed view (e.g., a zoomed-in portion) of FIG. 3, or may be generated using different settings (e.g., difference reference current settings and/or different target rotation speed settings) for the PMSM system 100. FIG. 5 shows curves 201, 207, and

209 between time instants t2 and t4, where time instants t2, t3, and t4 in FIG. 5 correspond to time instants t2, t3, and 4 in FIG. 3. In FIG. 5, the curve 201 shows the first reference current value $I_q^{}$, the curve 207 shows the actual (e.g., measured) rotation speed of the rotor, and the curve 209** shows the phase current of one of the three-phase currents supplied to the windings of the stator.

Figure 6:
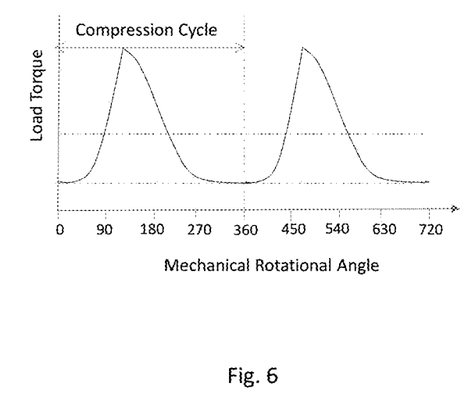
FIG. 6 illustrates a load torque of a compressor, in an embodiment.

FIG. 6 illustrates a load torque of a compressor, in an embodiment. As illustrated in FIG. 6, the load torque may vary depends on the mechanical rotation angle of the rotor. If, during the start-up process, the rotor is at an angle with high load torque, it may be hard to switch into the speed control loop at that angle, due to, e.g., the relative slow response time and lower torque of the speed control loop. The presently disclosed multi-stage method, by abruptly changing the direction of the current component $I_{vssq}$ at time instant t2 (to start the motor at maximum torque), and by using the asynchronous driving stage and the torque closed-loop control stage (which provides large torque and fast response time) to speed up the rotor to a stable, pre-determined rotation speed, ensures a smooth transition to the final speed closed-loop control stage, and avoids or reduces motor start failure.

Figure 7:
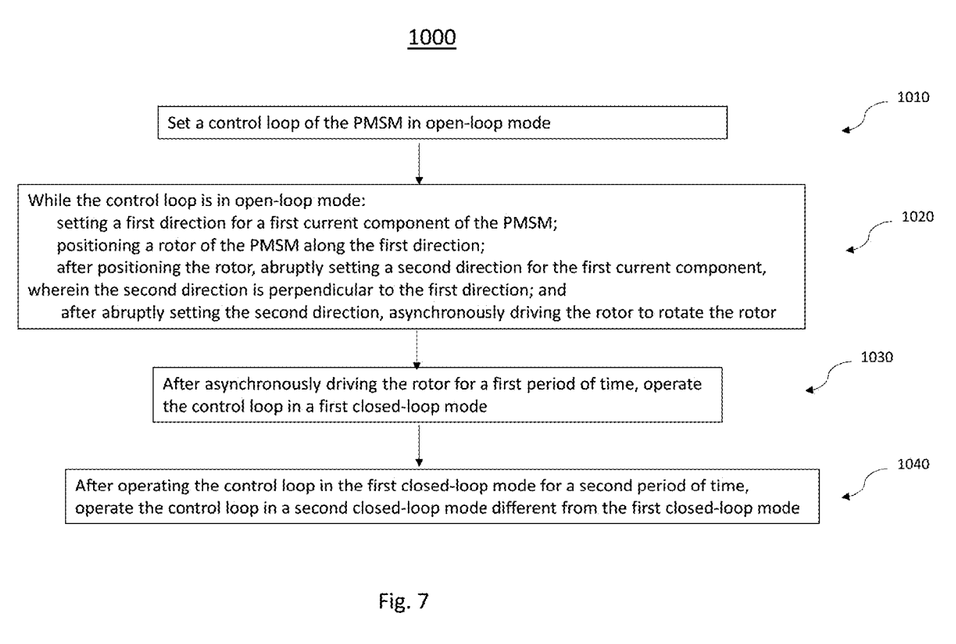
FIG. 7 illustrates a flow chart of a method of starting a PMSM with field oriented control (FOC), in an embodiment.

FIG. 7 illustrates a flow chart of a method 1000 of starting a PMSM with field oriented control (FOC), in an embodiment. It should be understood that the embodiment method shown in FIG. 7 is merely an example of many possible embodiment methods. One of ordinary skill in the art would recognize many variations, alternatives, and modifications. For example, various steps as illustrated in FIG. 7 may be added, removed, replaced, rearranged, or repeated.

Referring to FIG. 7, at block 1010, a control loop of the PMSM is set in open-loop mode. At block 1020, while the control loop is in open-loop mode: a first direction for a first current component of the PMSM is set; a rotor of the PMSM is positioned along the first direction; after positioning the rotor, a second direction for the first current component is abruptly set, wherein the second direction is perpendicular to the first direction; and after abruptly setting the second direction, the rotor is asynchronously driven to rotate the rotor. At block 1030, after asynchronously driving the rotor for a first period of time, the control loop is operated in a first closed-loop mode. At block 1040, after operating the control loop in the first closed-loop mode for a second period of time, the control loop is operated in a second closed-loop mode different from the first closed-loop mode.

Disclosed embodiments may achieve advantages. For example, the disclosed multi-stage method abruptly changes the direction of the current component $I_{vssq}$ at time instant t2, this allows the motor to start at a maximum torque. After the asynchronous driving stage, the torque closed-loop control stage provides a large torque and fast response time to further speed up the rotor. Transition to the speed closed-loop control stage is performed after the rotor speed reaches a stable, pre-determined rotation speed. This ensures a smooth start-up process, and avoids or reduces motor start failure. The disclosed method is able to start PMSM at high load previously unachievable. For example, consider a scenario where while a refrigerator compressor (e.g., a PMSM) is running, the power is suddenly lost, and then comes back on. The resulting internal pressure in the compressor is very high, and the compressor may need to start with suction pressure at 0.1 MPa and exhaust pressure at 0.6 MPa. A conventional start-up control method without the presently disclosed method may not be able to start the compressor. The disclosed method herein, however, is able to smoothly start the compressor up with the high back pressure.

Example embodiments of the present invention are summarized here. Other embodiments can also be understood from the entirety of the specification and the claims filed herein.

Example 1. In an embodiment, a method of starting a permanent magnet synchronous motor (PMSM) with field oriented control (FOC) includes: opening a first control loop of the PMSM; setting a first direction for a first current component of the PMSM; aligning a rotor of the PMSM to the first direction; after aligning the rotor, setting a second direction for the first current component, where the second direction is rotated from the first direction by 90 degrees; after setting the second direction, starting the rotor while the first control loop of the PMSM remains open; after starting the rotor, increasing a rotation speed of the rotor by operating the first control loop in a first closed-loop mode; and after increasing the rotation speed of the rotor, controlling the rotation speed of the rotor by operating the first control loop in a second closed-loop mode different from the first closed-loop mode.

Example 2. The method of Example 1, wherein setting the second direction comprises changing a direction of the first current component from the first direction to the second direction abruptly.

Example 3. The method of Example 1, wherein operating the first control loop in the second closed-loop mode comprises setting the first control loop in the second closed-loop mode after the rotation speed of the rotor reaches a pre-determined rotation speed.

Example 4. The method of Example 1, wherein the first current component is perpendicular to a second current component of the PMSM, wherein the first current component and the second current component are obtained by transforming phase currents supplied to windings of a stator of the PMSM using a Clarke transformation followed by a Park transformation.

Example 5. The method of Example 4, wherein aligning the rotor comprises aligning a magnetic moment of the rotor with the first direction of the first current component.

Example 6. The method of Example 4, wherein the first control loop is driven by a first error signal, wherein the PMSM further has a second control loop driven by a second error signal, wherein the first error signal is a first difference between a first reference current value and the first current component of the PMSM, and the second error signal is a second difference between a second reference current value and the second current component of the PMSM.

Example 7. The method of Example 6, wherein the second reference current value has a constant value of zero.

Example 8. The method of Example 6, wherein setting the first direction for the first current component comprises: setting a transformation angle of the Park transformation to a first angle; and setting the first reference current value to a pre-determined current value.

Example 9. The method of Example 8, wherein setting the second direction for the first current component comprises setting the transformation angle of the Park transformation to a second angle, wherein the second angle is rotated 90 degrees from the first angle.

Example 10. The method of Example 9, wherein the starting the rotor comprises sweeping the transformation angle of the Park transformation across a pre-determined range of angles.

Example 11. The method of Example 8, wherein setting the first reference current value comprises gradually increasing the first reference current value from zero to the pre-determined current value, wherein the first reference current value remains at the pre-determined current value after aligning the rotor and before operating the first control loop in the second closed-loop mode.

Example 12. The method of Example 11, wherein operating the first control loop in the second closed-loop mode comprises: calculating a difference between a target rotation speed of the rotor and an estimated rotation speed of the rotor; sending the calculated difference to a Proportional-Integral (PI) circuit; and using an output of the PI circuit as the first reference current value for the first control loop.

Example 13. In an embodiment, a method of starting a permanent magnet synchronous motor (PMSM) with field oriented control (FOC) includes: setting a control loop of the PMSM in open-loop mode; and while the control loop is in open-loop mode: setting a first direction for a first current component of the PMSM; positioning a rotor of the PMSM along the first direction; after positioning the rotor, abruptly setting a second direction for the first current component, wherein the second direction is perpendicular to the first direction; and after abruptly setting the second direction, asynchronously driving the rotor to rotate the rotor. The method further includes: after asynchronously driving the rotor for a first period of time, operating the control loop in a first closed-loop mode; and after operating the control loop in the first closed-loop mode for a second period of time, operating the control loop in a second closed-loop mode different from the first closed-loop mode.

Example 14. The method of Example 13, wherein the PMSM has a second current component perpendicular to the first current component, wherein the first current component and the second current component are in a two-axis coordinate system that is rotating with the rotor, wherein the first current component and the second current component are related to three-phase currents supplied to windings of a stator of the PMSM through a Clarke transformation and a Park transformation.

Example 15. The method of Example 14, wherein asynchronously driving the rotor comprises: providing, by a controller of the PMSM, a transformation angle for the Park transformation, wherein the transformation angle sweeps cross a pre-determined range of angles; computing a first error signal by subtracting the first current component from a first reference current value provided by the controller of the PMSM, wherein the first reference current value has a first constant value; computing a second error signal by subtracting the second current component from a second reference current value having a second constant value; and generating driving voltages for the windings of the stator of the PMSM based on the first error signal and the second error signal.

Example 16. The method of Example 15, wherein operating the control loop in the first closed-loop mode comprises: estimating an angle between the rotor and the stator of the PMSM and using the estimated angle as the transformation angle of the Park transformation; computing a third error signal by subtracting the first current component from the first reference current value having the first constant value; computing a fourth error signal by subtracting the second current component from the second reference current value having the second constant value; and generating the driving voltages for the windings of the stator of the PMSM based on the third error signal and the fourth error signal.

Example 17. The method of Example 16, wherein operating the control loop in the second closed-loop mode comprises: estimating the angle between the rotor and the stator of the PMSM and using the estimated angle as the transformation angle of the Park transformation; computing a fifth error signal by subtracting the first current component from a third reference current value, wherein the third reference current value is calculated based on a target rotation speed of the rotor and an estimated rotation speed of the rotor; computing a sixth error signal by subtracting the second current component from the second reference current value having the second constant value; and generating the driving voltages for the windings of the stator of the PMSM based on the fifth error signal and the sixth error signal.

Example 18. In an embodiment, a permanent magnet synchronous motor (PMSM) system with field oriented control (FOC) includes: a PMSM motor; an inverter coupled to the PMSM motor; and a controller coupled to the inverter, wherein the controller is configured to start the PMSM by: setting a control loop of the PMSM in open-loop mode; while the control loop is in open-loop mode: setting a first direction for a first current component of the PMSM; positioning a rotor of the PMSM along the first direction; after positioning the rotor, abruptly setting a second direction for the first current component, wherein the second direction is perpendicular to the first direction; and after abruptly setting the second direction, asynchronously driving the rotor to rotate the rotor; after asynchronously driving the rotor for a first period of time, operating the control loop in a first closed-loop mode; and after operating the control loop in the first closed-loop mode for a second period of time, operating the control loop in a second closed-loop mode different from the first closed-loop mode.

Example 19. The PMSM system of Example 18, wherein the controller is configured to supply a reference value for the control loop, wherein after positioning the rotor and before operating the control loop in the second closed-loop mode, the reference value has a constant value.

Example 20. The PMSM of Example 19, wherein after operating the control loop in the second closed-loop mode, the reference value has a time-varying value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of starting a permanent magnet synchronous motor (PMSM) with field oriented control (FOC), the method comprises:
   opening a first control loop of the PMSM;
   setting a first direction for a first current component of the PMSM, wherein the first current component is perpendicular to a second current component of the PMSM, wherein the first current component and the second current component are obtained by transforming phase currents supplied to windings of a stator of the PMSM using a Clarke transformation followed by a Park transformation, wherein the first control loop is configured to be driven by a first error signal, wherein the first error signal is a first difference between a first reference current value and the first current component of the PMSM, wherein setting the first direction for the first current component comprises:
   setting a transformation angle of the Park transformation to a first angle; and setting the first reference current value to a pre-determined current value by gradually increasing the first reference current value from zero to the pre-determined current value;

after setting the first direction, aligning a rotor of the PMSM to the first direction;

after aligning the rotor, setting a second direction for the first current component, wherein the second direction is rotated from the first direction by 90 degrees;

after setting the second direction, starting the rotor in an asynchronous driving mode while the first control loop of the PMSM remains open, wherein in the asynchronous driving mode, the transformation angle of the Park transformation is provided by a controller of the PMSM and is independent of an angle of the rotor, wherein a value of the transformation angle changes from a first pre-determined value to a second pre-determined value;

after starting the rotor, increasing a rotation speed of the rotor by operating the first control loop in a first closed-loop mode; and after increasing the rotation speed of the rotor, controlling the rotation speed of the rotor by operating the first control loop in a second closed-loop mode different from the first closed-loop mode, wherein the first reference current value remains at the pre-determined current value in the asynchronous driving mode and in the first closed-loop mode.

2. The method of claim 1, wherein setting the second direction comprises changing a direction of the first current component from the first direction to the second direction abruptly.

3. The method of claim 1, wherein operating the first control loop in the second closed-loop mode comprises setting the first control loop in the second closed-loop mode after the rotation speed of the rotor reaches a pre-determined rotation speed.

4. The method of claim 1, wherein aligning the rotor comprises aligning a magnetic moment of the rotor with the first direction of the first current component.

5. The method of claim 1, wherein the PMSM further has a second control loop driven by a second error signal, wherein the second error signal is a second difference between a second reference current value and the second current component of the PMSM.

6. The method of claim 5, wherein the second reference current value has a constant value of zero.

7. The method of claim 1, wherein in the first closed-loop mode and the second closed-loop mode, the transformation angle of the Park transformation is an estimate of the angle of the rotor.

8. The method of claim 1, wherein setting the second direction for the first current component comprises setting the transformation angle of the Park transformation to a second angle, wherein the second angle is rotated 90 degrees from the first angle.

9. The method of claim 8, wherein the starting the rotor comprises sweeping the transformation angle of the Park transformation across a pre-determined range of angles.

10. The method of claim 1, wherein operating the first control loop in the second closed-loop mode comprises:
calculating a difference between a target rotation speed of the rotor and an estimated rotation speed of the rotor;
sending the calculated difference to a Proportional-Integral (PI) circuit; and
using an output of the PI circuit as the first reference current value for the first control loop.

11. A method of starting a permanent magnet synchronous motor (PMSM) with field oriented control (FOC), the method comprises:
setting a control loop of the PMSM in open-loop mode;
while the control loop is in open-loop mode:
setting a first direction for a first current component of the PMSM, wherein the PMSM has a second current component perpendicular to the first current component, wherein the first current component and the second current component are in a two-axis coordinate system that is rotating with a rotor of the PMSM, wherein the first current component and the second current component are related to three-phase currents supplied to windings of a stator of the PMSM through a Clarke transformation and a Park transformation;
positioning the rotor of the PMSM along the first direction;
after positioning the rotor, abruptly setting a second direction for the first current component, wherein the second direction is perpendicular to the first direction; and
after abruptly setting the second direction, asynchronously driving the rotor to rotate the rotor, wherein asynchronously driving the rotor comprises, providing, by a controller of the PMSM, a transformation angle for the Park transformation, wherein during the asynchronously driving, the transformation angle is independent of an angle of the rotor, and a value of the transformation angle provided by the controller changes repeatedly from a first pre-determined value to a second pre-determined value;
after asynchronously driving the rotor for a first period of time, operating the control loop in a first closed-loop mode; and
after operating the control loop in the first closed-loop mode for a second period of time, operating the control loop in a second closed-loop mode different from the first closed-loop mode, wherein the control loop is driven by a first error signal and a second error signal, wherein the first error signal is computed by subtracting the first current component from a first reference current value, wherein the first reference current value has a first constant value during the asynchronously driving and during the first closed-loop mode, and has a timing-varying value during the second closed-loop mode.

12. The method of claim 11, wherein asynchronously driving the rotor further comprises:
computing the first error signal by subtracting the first current component from the first reference current value provided by the controller of the PMSM, wherein the first reference current value has the first constant value;
computing the second error signal by subtracting the second current component from a second reference current value having a second constant value; and
generating driving voltages for the windings of the stator of the PMSM based on the first error signal and the second error signal.

13. The method of claim 12, wherein operating the control loop in the first closed-loop mode comprises:
estimating an angle between the rotor and the stator of the PMSM and using the estimated angle as the transformation angle of the Park transformation;
computing a third error signal by subtracting the first current component from the first reference current value having the first constant value;

computing a fourth error signal by subtracting the second current component from the second reference current value having the second constant value; and generating the driving voltages for the windings of the stator of the PMSM based on the third error signal and the fourth error signal.

14. The method of claim 13, wherein operating the control loop in the second closed-loop mode comprises:

estimating the angle between the rotor and the stator of the PMSM and using the estimated angle as the transformation angle of the Park transformation;

computing a fifth error signal by subtracting the first current component from a third reference current value, wherein the third reference current value is calculated by:
  computing a difference between a target rotation speed of the rotor and an estimated rotation speed of the rotor; and
  sending the difference to a proportional-integral (PI) circuit, wherein an output of the PI circuit is the third reference current value;

computing a sixth error signal by subtracting the second current component from the second reference current value having the second constant value; and generating the driving voltages for the windings of the stator of the PMSM based on the fifth error signal and the sixth error signal.

15. The method of claim 11, wherein in the first closed-loop mode and the second closed-loop mode, the transformation angle of the Park transformation is an estimate of the angle of the rotor.

16. A permanent magnet synchronous motor (PMSM) system with field oriented control (FOC), the PMSM system comprising:

a PMSM motor;

an inverter coupled to the PMSM motor; and a controller coupled to the inverter, wherein the controller is configured to start the PMSM by:
  setting a control loop of the PMSM in open-loop mode;
  while the control loop is in open-loop mode:
    setting a first direction for a first current component of the PMSM, wherein the PMSM has a second current component perpendicular to the first current component, wherein the first current component and the second current component are in a two-axis coordinate system that is rotating with a rotor of the PMSM, wherein the first current component and the second current component are related to three-phase currents supplied to windings of a stator of the PMSM through a Clarke transformation and a Park transformation;
    positioning the rotor of the PMSM along the first direction;
    after positioning the rotor, abruptly setting a second direction for the first current component, wherein the second direction is perpendicular to the first direction; and
    after abruptly setting the second direction, asynchronously driving the rotor to rotate the rotor, wherein asynchronously driving the rotor comprises, providing, by a controller of the PMSM, a transformation angle for the Park transformation, wherein the transformation angle is independent of an angle of the rotor, wherein a value of the transformation angle provided by the controller changes from a first pre-determined value to a second pre-determined value;
  after asynchronously driving the rotor for a first period of time, operating the control loop in a first closed-loop mode; and
  after operating the control loop in the first closed-loop mode for a second period of time, operating the control loop in a second closed-loop mode different from the first closed-loop mode, wherein the control loop is driven by a first error signal and a second error signal, wherein the first error signal is computed by subtracting the first current component from a first reference current value, wherein the first reference current value has a first constant value during the asynchronously driving and during the first closed-loop mode, and has a timing-varying value during the second closed-loop mode.

17. The PMSM system of claim 16, wherein the controller is configured to supply the first reference current value for the control loop during the open-loop mode and during the first closed-loop mode, wherein the controller is further configured to provide a second reference current value for computing the second error signal, wherein the second reference current value has a second constant value during the open-loop mode, the first closed-loop mode, and the second closed-loop mode.

18. The PMSM system of claim 17, wherein the controller is configured to increase the first reference current value from zero to the first constant value during the setting the first direction.

19. The PMSM system of claim 17, wherein the second constant value is zero.

* * * * *